United States Patent [19]

Graebe

[11] 4,005,236
[45] Jan. 25, 1977

[54] EXPANDABLE MULTICELLED CUSHIONING STRUCTURE

[76] Inventor: Robert H. Graebe, 4 Signal Hill Blvd., Belleville, Ill. 62223

[22] Filed: Feb. 28, 1975

[21] Appl. No.: 554,117

Related U.S. Application Data

[62] Division of Ser. No. 360,743, May 16, 1973, Pat. No. 3,870,450.

[52] U.S. Cl. .................................. 428/72; 428/178; 5/345 R; 5/350
[51] Int. Cl.² ........................................ A47C 27/08
[58] Field of Search .......... 425/269, 275; 5/348 R, 5/345 R, 368–369, 350; 428/178, 72

[56] References Cited

UNITED STATES PATENTS

| | | | |
|---|---|---|---|
| 2,461,270 | 2/1949 | Habib et al. .................... | 425/275 |
| 3,112,956 | 12/1963 | Schick et al. .................. | 5/348 R X |
| 3,251,076 | 5/1966 | Burke ............................. | 5/345 R |
| 3,605,145 | 9/1971 | Graebe ........................... | 5/348 R |
| 3,740,777 | 6/1973 | Dee ................................. | 5/348 R |
| 3,813,716 | 6/1974 | Francis ........................... | 5/348 R |

Primary Examiner—Philip Dier
Attorney, Agent, or Firm—Gravely, Lieder & Woodruff

[57] ABSTRACT

A multicelled structure which may be used as a body support or other cushioning device has inflatable cells against which a supported or cushioned body bears. The structure is formed from a flexible material on mandrels which have a fluted or other shaped configuration and spaced apart. This prevents the material which is in a soft or uncured condition from bridging adjacent cells during the forming operation. The fluting or shape on the resulting cells is configured to enable the side walls of adjacent cells to closely approach or contact each other when the cells are expanded by internal fluid pressure so that the end walls of the cells form a generally continuous surface.

11 Claims, 8 Drawing Figures

EXPANDABLE MULTICELLED CUSHIONING STRUCTURE

This is a division of application Ser. No. 360,743, filed May 16, 1973 and now U.S. Pat. No. 3,870,450.

BACKGROUND OF THE INVENTION

This invention relates in general to multicelled structures such as a body supporting device and more particularly to a method and apparatus for forming inflatable devices as well as the inflatable device itself.

Through clinical tests it has been determined that one of the better methods of preventing the development of bed sores on invalids is to support such persons on a series of flexible intercommunicated cells. Since the cells are intercommunicated all exert an equal supporting force against the engaged individual. Such an arrangement of cells is disclosed in U.S. Pat. No. 3,605,145.

In order to have the supporting force distributed over as large an area as possible, it is necessary to have the sides of the cells in close proximity to one another and preferably touching one another. When this condition exists, the ends of the cells form a generally continuous and conformal surface on which the supported individual sits or reclines. Such devices may be used for general cushioning and impact protection purposes also.

Heretofore, the only practical method of producing multicelled structures with closely spaced or contacting cells was to mold, dip or otherwise form the cells individually and then secure them to a base capable of providing physical support and/or intercommunication between the cells. This procedure is not only time consuming and expensive, but also leaves the finished product with a multitude of seams along which leaks may develop. Hence, it is desirable to form the multicelled structure as an integral unit.

SUMMARY OF THE INVENTION

One of the principal objects of the present invention is to provide a process and an apparatus for producing a multicell structure such as a body supporting device in which the cells are formed along with a base as an integral unit and when inflated will contact or nearly contact one another. Another object is to provide a process and an apparatus of the type stated which are economical and easy to use. A further object is to provide a process and an apparatus for producing a multicell structure which has a minimum amount of seams and hence is very reliable. It is a further object to produce cells which have a large range of height to diameter or base area ratios. An additional object is to provide a multicell structure which is inexpensive and extremely reliable. These and other objects and advantages will become apparent hereinafter.

The present invention is embodied in an apparatus for forming a multicell structure having expandable cells which are initially in a configuration so that the cells when formed are spaced apart but when later expanded by a pressurized fluid can have various shaped cross sections and will contact or be closely spaced to one another at their side walls. The invention also resides in the multicelled structure itself as well as the process for forming the fluted cells. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur.

DETAILED DESCRIPTION

Figure 1:
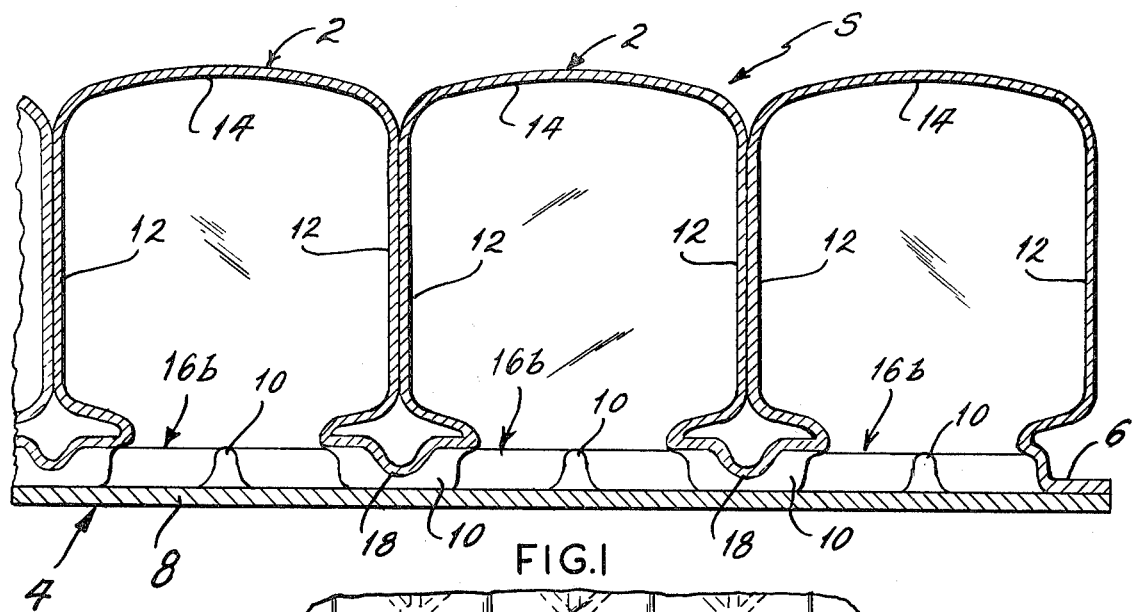
FIG. 1 is a sectional view of a multicell structure such as a body support having intercommunicated cells.
Figure 2:
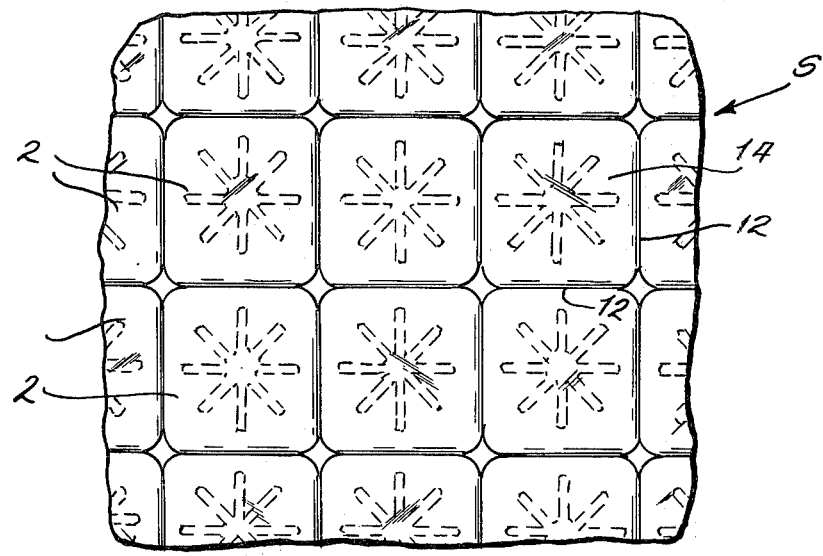
FIG. 2 is a plan view of the multicell structure of FIG. 1 and showing the cells when deflated in interrupted lines.
Figure 3:
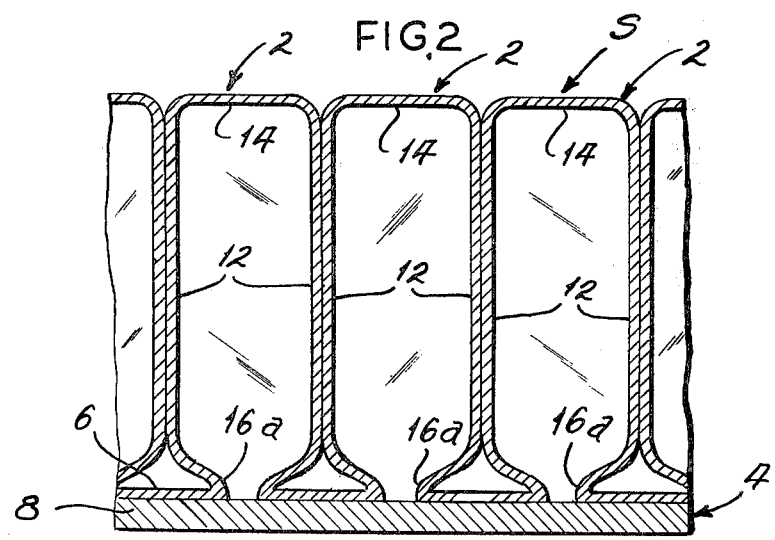
FIG. 3 is a sectional view of an alternative multicelled structure having pneumatically independent cells.

Referring now to the drawings (FIGS. 1–3), S designates a multicell structure which forms part of the present invention and is produced with the tooling and in accordance with the process of the present invention. The multicell structure S includes a plurality of cells 2 attached to a common base 4 comprised of an intervening layer 6 occupying the area between the cells 2 and a sealing layer 8 underlying the intervening layer 6. The intervening layer 6 is preferably embossed between adjacent cells 2 to provide internal fluid transfer channels 10 which interconnect the cells 2 so that all the cells 2 are in communication (FIG. 1). This results in equal pressure within the cells 2. However, the cells 2 may be pneumatically independent of one another (FIG. 3).

The base should be provided with a valve for inflating the body support S. The multicell structure S is used as a cushioning device or impact absorbing device. It is ideally suited for use as a body support such as a mattress or seat cushion. Each cell 2 has a side wall 12, an end wall 14, and a connecting portion 16a or b interposed between the side wall 12 and intervening layer 6 of the base 4 for attaching the cell 2 to the base 4. The connecting portion may take the form of a reduced neck 16a (FIG. 3) or a flared or otherwise enlarged pedestal 16b (FIG. 1). When deflated the side wall 12 possesses a fluted configuration, and the side walls 12 of adjacent cells 2 are spaced a substantial distance apart (FIG. 2, dotted lines). However, when the cells 2 are pressurized, the side walls 12 assume a generally cylindrical configuration or they can be made to form other cross-sectional shapes. However, the side walls 12 of adjacent cells 2 may contact and interfere with one another to such an extent that they deform each other into more or less rectangular configurations (FIG. 2, full lines). The fit is quite tight, and as a result the end walls 14 of the air cells 2 form a generally continuous outwardly exposed surface on the multicell structure S. This surface will conform to objects forced against it and hence may be described as a conformal surface. The fluid transfer channels 10 when used may be provided with restrictions 18 to regulate the rate of fluid transfer between cells 2.

Figure 4:
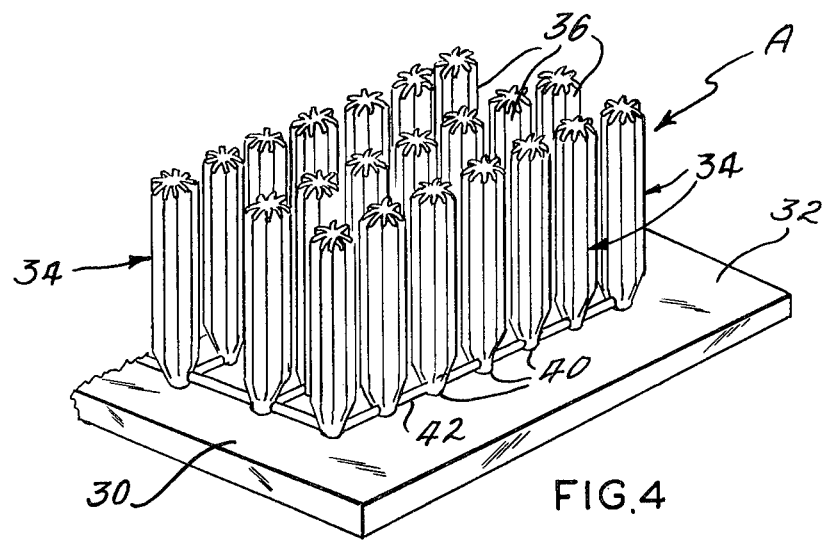
FIG. 4 is a perspective view of a flat based tool used to form a multicelled structure having intercommunicated cells.

The apparatus or tool A for forming the multicell structure S includes (FIGS. 4–8) a base member 30 having a generally flat surface 32, and mandrels 34 projecting outwardly from the surface 32. The mandrels 34 are arranged in longitudinally and transversely extending rows (FIG. 4). Moreover, the mandrels 34 are spaced from one another as may be required to accommodate a mix of mandrel sizes.

Figure 5:
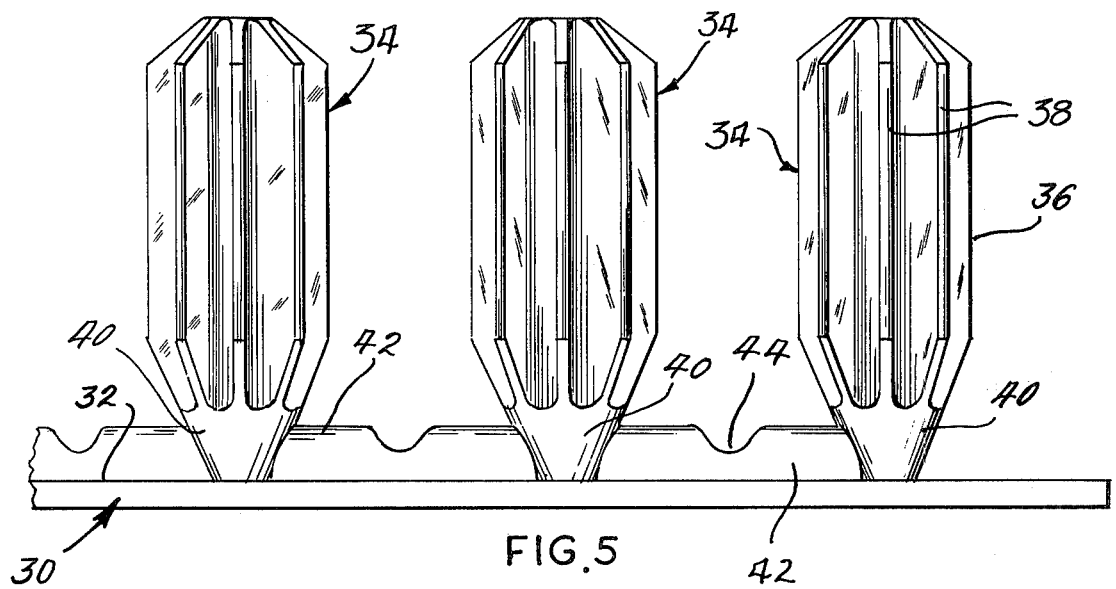
FIG. 5 is a detailed elevational view of the fluted mandrels illustrated in FIG. 4 where the fluted mandrel has a reduced connecting portion.
Figure 6:
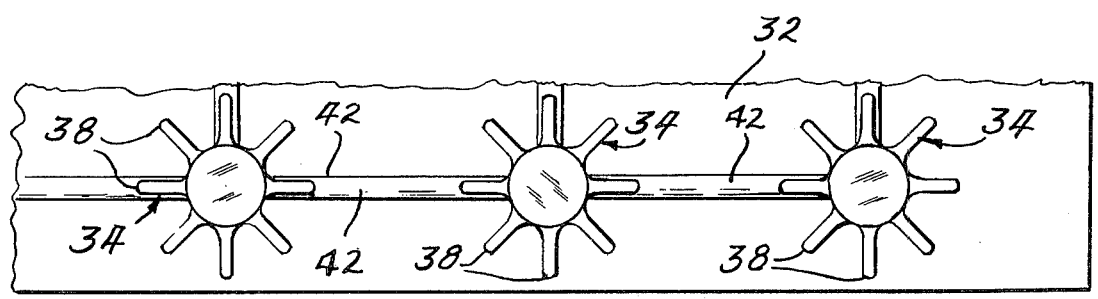
FIG. 6 is a plan view of one row of the tool illustrated in FIG. 4.
Figure 7:
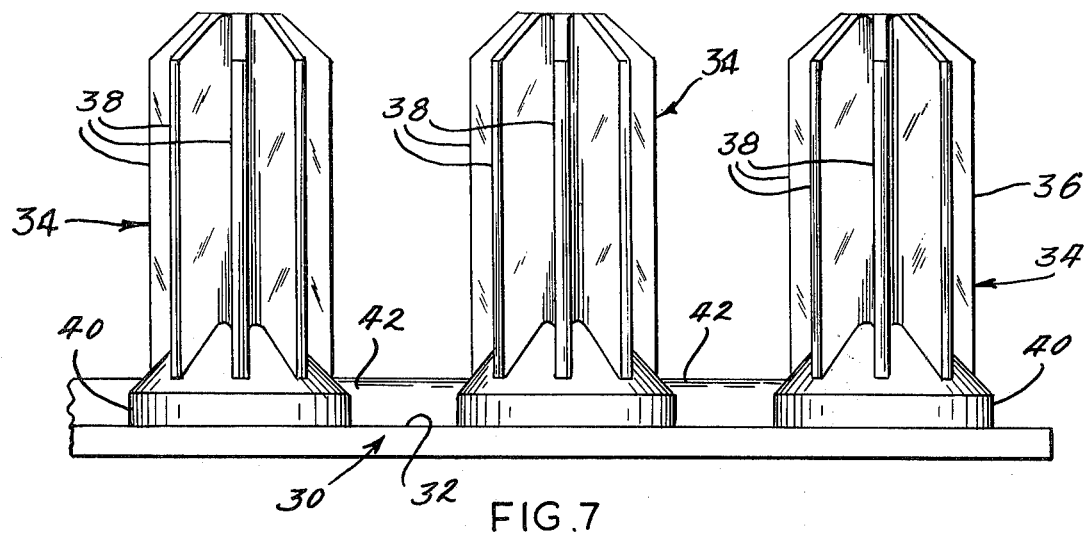
FIG. 7 is an elevational view of a alternate fluted mandrel which may be used to form the multicelled structure of FIG. 1 where the fluted mandrel has a conical pedestal like connecting portions.
Figure 8:
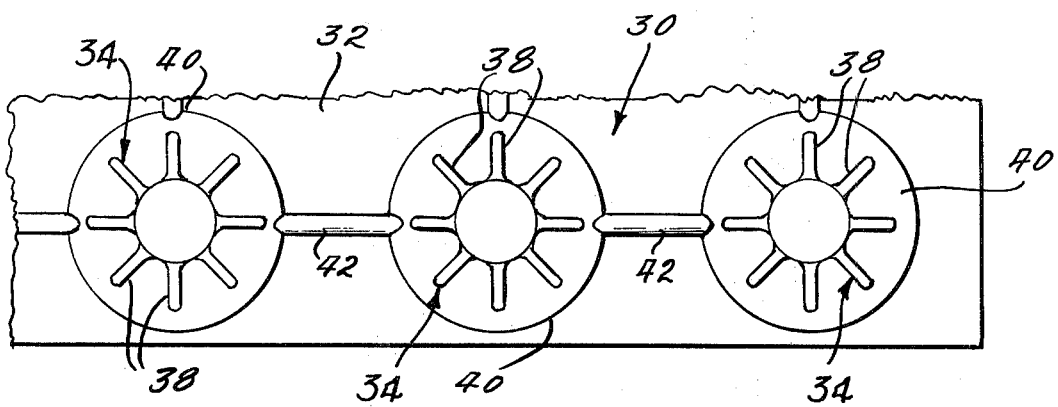
FIG. 8 is a plan view of the tool illustrated in FIG. 7.

Each mandrel 34 for most of its length is fluted, having a fluted portion 36 provided with a plurality of radially directed ribs 38. The upper ends of the ribs 38 may be tapered to affect the pressurized shape of the cell 2 formed thereon. The opposite end of the fluted portion 36 merges into the attaching portion 40, or may extend all the way to the surface 32 on the base member 30. If the tool A is to form cells 2 having reduced necks 16a, then the attaching portion 40 of the mandrel 34 should taper inwardly (FIG. 5). On the other hand, if the mandrel 34 is to form cells 2 having a flared pedestal 16b, then the attaching portion 40 of the mandrel 34 should flare outwardly (FIG. 7). When the fluid transfer channels 10 are desired in the multicell structure S, the attaching portions 40 of adjacent mandrels 34 are joined by elongated embossments 42 which project outwardly from the surface 32 of the base member 30. Approximately midway between their ends the embossments 42 may be reduced in thickness to form necks 44.

The cells 2 and the intervening layer 6 of the multicelled structure S may be formed as an integral unit by dipping the tool A into a vat containing a suitable coating material in liquid or semiliquid condition. The tool A is immersed sufficiently to enable the liquid to cover and coat the flat surface 32 on the base member 30. The material should, of course, adhere to the mandrel 34 so as to coat the mandrel 34 as it is dipped. Preferably, this material is of such a nature that it can be cured to a flexible fluid impervious condition. The tool A is dipped to provide a coating of desired thickness, and once this coating is acquired, the tool A is removed from the vat and the coating is cured to the extent that it assumes desired characteristics. Then the integrally formed cells 2 and intervening layer 6 are stripped from the tool A. If the cells 2 are formed with enlarged pedestals 16b, or have ribs 38 extended straight to the surface 32, adequate draft angles can be used to permit the use of a two piece pressure mold as may be used for injection molding. In this connection, the cells 2 and integral intervening layer 6 can be formed in an injection molding operation also.

Once the integrally formed cells 2 and intervening layer 6 are removed from the tool A, the sealing layer 8 of the base 4 is adhesively or otherwise secured to the back face of the intervening layer 6, both along the periphery of the base 4 and also between adjacent air cells 2. The sealing layer 8 is merely a flat sheet of suitable material. As a result those portions of the intervening layer 6 which are molded about the elongated embossment 42 will be raised from the sealing layer 8 and hence, from the fluid transfer channels 10 in the common base 4. Since the sealing layer 8 is secured to the intervening layer 6 between adjacent cells 2; the base 4 will not balloon outwardly when the multicell structure S is pressurized.

The ribs 38 on the fluted portion 36 of the mandrel 34 enable the cells 2 to be formed in a configuration relatively small in diameter. This, in turn, prevents the coating material from bridging adjacent mandrels 34 so that the cells 2 as formed are separate and distinct from one another. They need not be cut apart. Nevertheless, the ribs 38 provide sufficient wall surface on the side walls 12 of the cells 2 to enable the cells 2 when pressurized to assume a much larger diameter. Indeed, the side walls 12 possesses sufficient material to enable adjacent cells 2 to contact one another and in so doing substantially deform each other. As a result, the end walls 14 of the cells 2 form a substantially continuous surface across the upper end of the body support S.

Other mandrel shapes can also be used. A rectangular or otherwise elongated cross sectional shape in lieu of a fluted cross sectioned shape for the mandrels 34 would produce cells 2 which would also tend to assume a cylindrical configuration when pressurized and therefore be made to contact adjacent cells 2. The fluted mandrel yields the largest cell inflation diameter to mandrel diameter and is therefore the preferred configuration.

When the multicell structure S is made with all the cells 2 flexible and intercommunicated through the fluid transfer channels 10, the continuous upper surface formed by the end walls 14 of the cells 2 is highly conformal in nature and will easily conform to the contour of objects placed against it. For example, if an invalid sits or reclines on the multicell structure S, the end walls 14 of the cells 2 will conform to and contact practically the entire skin area overlying the multicell structure S. Therefore, the supporting force exerted by the multicell structure S is spread over the entire skin area and is not concentrated in localized areas as is true of mattresses of current construction. As a result, the chances of bed sores developing are minimized when the structure S is used as a mattress or seat cushion for invalids.

In lieu of forming the base member 30 of the tool with a flat surface 32 from which the mandrels 34 project, the surface 32 may be cylindrical or spherical.

The cells 2 and intervening layer 6 need not be formed from a flexible or elastomeric material, but instead may be formed from a material such as a metal. In that case the metal can be applied on the mandrels 34 and base 30 in a electroforming process.

This invention is intended to cover all changes and modifications of the example of the invention herein chosen for purposes of the disclosure which do not constitute departures from the spirit and scope of the invention.

What is claimed is:
1. A cushion device comprising: a base formed from a fluid impervious material and having at least one cavity therein which is isolated from the surrounding atmosphere and is capable of retaining a fluid under pressure; and a plurality of cells connected to the base and formed from a fluid impervious material which is flexible, the cells having hollow interiors which are isolated from the surrounding atmosphere and open into the cavity of the base such that the interiors of all of the cells communicate through the cavity of the base, the cells having side walls with the sidewalls of adjacent cells being located opposite each other, the cells when deflated being generally spaced apart and having flutes along their side walls, the flutes of each cell being generally parallel and arranged around the entire cell and further extending away from the base, the cells being sufficiently flexible that when pressur- ized they will expand laterally such that the flutes are generally obliterated and the side walls of adjacent cells are in contact for substantial portions of their lengths so as to interfere with each other, the cells when pressurized further being such that the ends of the cells form a generally continuous outwardly presented surface which conforms to the shapes of objects brought against it.

2. A cushion device according to claim 1 wherein the adjacent cells are in substantial contact and deform each other when the cells are inflated and pressurized.

3. A device according to claim 1 wherein the cavity in the base comprises a plurality of raised channels interconnecting the hollow interiors of adjacent cells.

4. A device according to claim 1 wherein the base comprises an intervening layer to which the cells are attached and a sealing layer underlying the intervening layer and being sealed thereto; and wherein the layers are in part separated to form the cavity in the base.

5. The device according to claim 4 wherein the intervening layer is raised between adjacent air cells with the raised portions of the intervening layer being separated from the sealing layer and forming channels which extend between and open into the interiors of adjacent cells, the plurality channels constituting the cavity within the base.

6. The device according to claim 4 wherein the cells are integral with the intervening layer.

7. The device according to claim 1 wherein each cell in addition to its side wall has an end wall connected across the outer end of its side wall and a connecting portion interposed between the side wall and the base and attached to the base, the end walls forming the generally continuous outwardly presented surface.

8. The device according to claim 7 wherein the connecting portion is of lesser width than the side wall when the cell is deflated so as to form a reduced neck where the cell is attached to the base.

9. The device according to claim 7 wherein the connecting portion has a generally flared shape when the cell is deflated with the greater width of that shape being at the base, so as to form an enlarged pedestal where the cell is attached to the base.

10. The device according to claim 9 wherein the greatest width of the frusto-conical connecting portion is larger than the greatest width of the side wall when the cell is deflated.

11. A cushion device comprising: a base formed from a fluid impervious material and having a cavity therein which is isolated from the surrounding atmosphere and is capable of retaining a fluid under pressure; and a plurality of cells connected to the base and formed from a fluid impervious material which is flexible, the cells having hollow interiors which open into the cavity of the base such that the interiors of all of the cells communicate with each other through the cavity of the base, each cell having a side wall and a flared pedestal interposed between the side wall and the base, the side wall when the cell is deflated having a plurality of flutes with the flutes being generally parallel and arranged around the entire cell and extending away from the pedestal, the pedestal when the cell is deflated being flared such that it possesses greater width at the base than at the side wall, the side walls of adjacent cells being generally spaced apart when the cells are deflated, but when the cells are pressurized the side walls are expanded such that the side walls of adjacent cells are in contact and interfere with each other, the cells when pressurized further being such that the ends of the cells form a generally continuous outwardly presented surface which conforms to the shapes of objects brought against it.

* * * * *